United States Patent [19]

Emigh et al.

[11] 3,973,133
[45] Aug. 3, 1976

[54] OZONE GENERATOR

[75] Inventors: Willard F. Emigh, El Dorado Hills; Rudi Beichel, Sacramento, both of Calif.

[73] Assignee: Aerojet-General Corporation, El Monte, Calif.

[22] Filed: Jan. 2, 1975

[21] Appl. No.: 538,286

Related U.S. Application Data

[62] Division of Ser. No. 450,698, March 13, 1974, Pat. No. 3,872,313.

[52] U.S. Cl. ............................................... 250/532
[51] Int. Cl.² .......................................... C01B 13/11
[58] Field of Search ............................. 250/532–541

[56] References Cited
UNITED STATES PATENTS

| | | | |
|---|---|---|---|
| 767,195 | 8/1904 | Zerbe | 250/533 |
| 1,396,222 | 11/1921 | Lindemann | 250/532 |
| 3,081,215 | 3/1963 | Held et al. | 250/532 X |
| 3,335,080 | 8/1967 | Waller et al. | 250/541 |
| 3,654,126 | 4/1972 | McNabney et al. | 250/533 |
| 3,663,418 | 5/1972 | Kawahata | 250/533 |
| 3,891,561 | 6/1975 | Lowther | 250/541 |

*Primary Examiner*—John H. Mack
*Assistant Examiner*—Aaron Weisstuch
*Attorney, Agent, or Firm*—J. Georg Seka

[57] ABSTRACT

An improved ozone generator formed from two groups of spaced, interleaved, relatively small reactor plates in a housing. Each of the plates is cooled by a coolant passing through the interior thereof. The coolant is a refrigerant flowing through a refrigeration system for which the plates define the evaporator. Each plate has a ceramic outer coating which provides a dielectric therefor and protects the plate from corrosion. Improved support means for each group of plates includes a pair of tubular mounts formed from fittings which convey the refrigerant to internal passages in the plates, provide the electrical connections thereto, and permit the plates to be coupled together as a modular unit so that the plates can be leak-tested before being placed in the housing. Improved fluid distribution means is provided at the inlet and outlet ends of the housing to assure uniform flow of air into the housing and uniform flow of air and ozone out of the housing.

2 Claims, 10 Drawing Figures

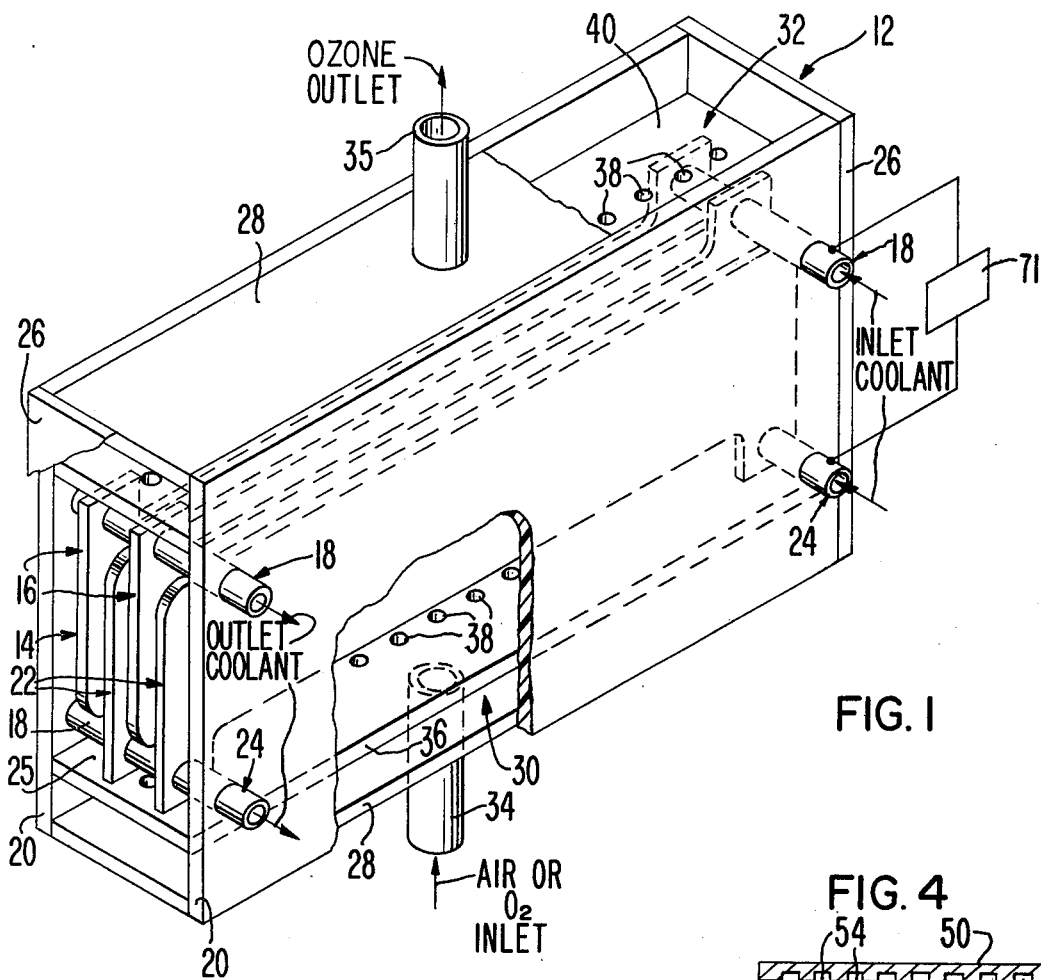
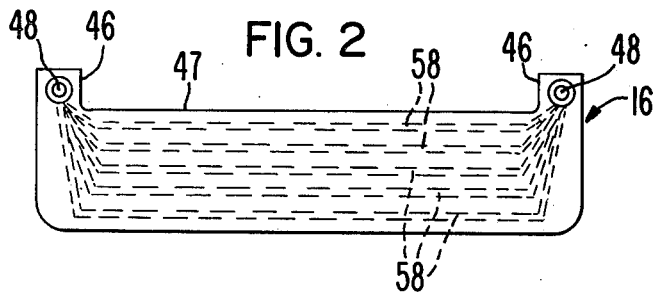
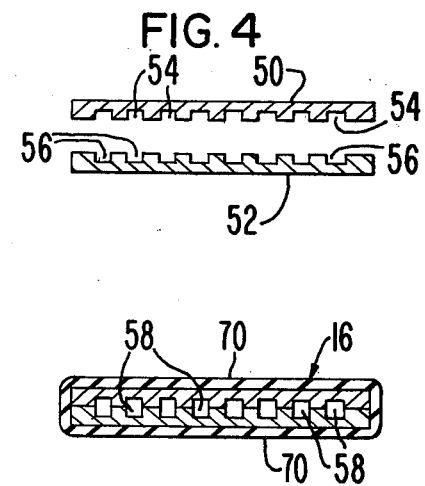
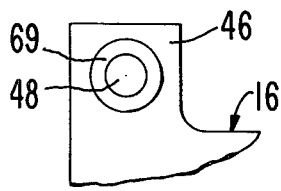

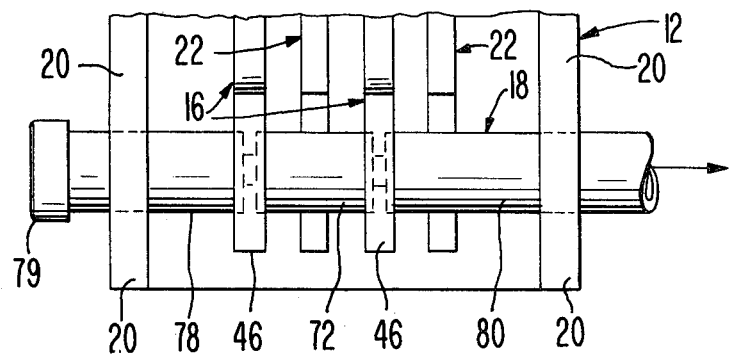
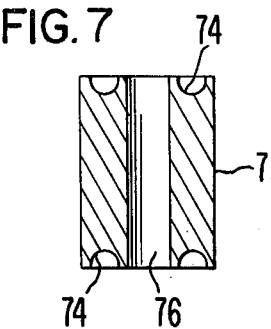
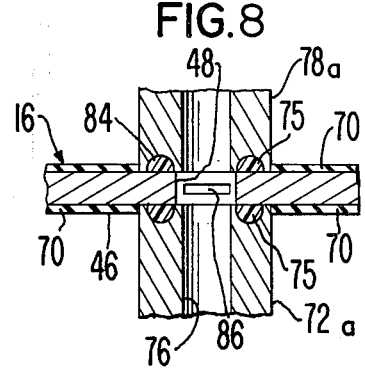
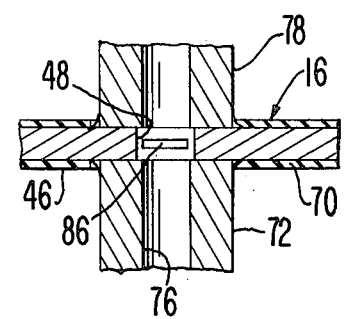
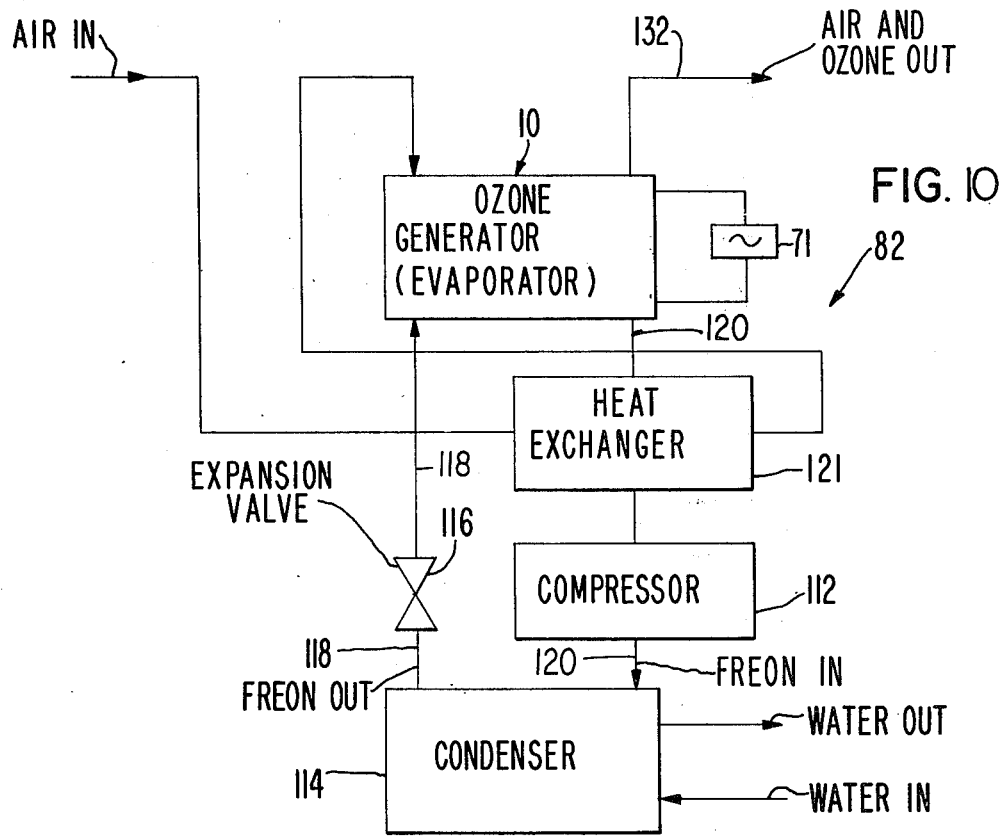

OZONE GENERATOR

This is a division of application Ser. No. 450,698 filed Mar. 13, 1974, now U.S. Pat. No. 3,872,313.

This invention relates to improvements in the production of ozone and, more particularly, to an improved ozone generator which is more efficient in operation than conventional ozone generators.

BACKGROUND OF THE INVENTION

Ozone generators have been constructed in the past with a plurality of spaced, interleaved electrode plates, whereby an electric field established between the plates causes ozone to be generated in the space between the plates. The ozone is then driven out of such spaces by incoming gas and is utilized at a remote location. Various types of dielectrics have been used with such electrode plates. Also, the way in which the dielectrics are mounted to or placed adjacent to the plates has been the subject of a number of different disclosures. Typical of these disclosures are the following U.S. Pat. Nos. 2,429,152; 2,260,831; 2,309,616; 3,010,892; 3,622,492; 3,081,215 and 3,654,126.

For the most part, these patents disclose the use of a dielectric coating on one face of each pair of adjacent reactor plates. When the plates are assembled, the coatings face each other and are maintained in spaced relationship by at least a pair of dielectric posts which span the distance between the coatings. As a result, each pair of adjacent reactor plates are separated by a very short "creep" distance which is defined as the distance through which electric charges from one plate can creep toward and onto the next adjacent plate when the two plates are at different potentials. In the aforesaid patents, this distance is measured in fractions of an inch because the reactor plates are quite close together because the dielectric posts are very short in length.

The use of the aforesaid dielectric posts requires frequent maintenance to keep the posts clean. They acquire deposits on their outer surfaces due to impurities in the air passing between the plates. These impurities provide the path by means of which charges "creep" from one plate to another. When this creeping occurs, stresses are set up in the dielectric coatings which eventually cause them to break down so as to result in a massive arc-over between the plates.

Other disclosures have shown that the reactor plates of an ozone generator can be hollow for receiving a coolant, such as water or oil, passing therethrough to cool the same during operation. Such disclosures include the following U.S. Pat. Nos. 2,118,969; 3,364,129, and 3,671,417. For the most part, the plates of these disclosures are bulky and heavy thereby requiring considerable space and complicated support structure.

Conventional ozone generators have generally not been provided with means for controlling the way in which air is directed into the spaces between the reactor plates and the way in which the ozone is removed from such spaces. Inlet air enters the reactor region at one location and must distribute itself merely by backpressure built up in such region due to a single, relatively small outlet. With no such control, incoming air is not uniformly distributed in the spaces so that certain portions of the spaces lack sufficient air for efficient ozone production while other portions of the spaces have an overabundance of air.

In a conventional ozone generator using coolants, it is required that the coolant be lowered in temperature after passing through the generator. This requires a refrigeration system whose evaporator is in heat exchange relationship to the coolant coming from the generator. Thus, both a coolant itself and some type of cooling apparatus, such as a refrigeration system with its refrigerant, is required to cool the reactor plates of an ozone generator when the plates have fluid passages therethrough.

Some types of conventional ozone generators cool only every other plate. This causes high temperatures in the regions between the electrode plates, resulting in minimal ozone production. Thus, relatively large plates are required to obtain a worthwhile ozone yield. In other conventional generators, only two electrode plates are used; thus, only one side of each plate is used for ozone production.

SUMMARY OF THE INVENTION

The present invention is directed to an improved ozone generator which overcomes the problems mentioned above with respect to conventional ozone generators. By virtue of the improvements of the present invention, ozone can be more efficiently generated at a lower cost, yet the generator can be substantially maintenance-free and can have any desired number of reactor plates depending upon the desired capacity of the ozone generator.

One of the features of the ozone generator of this invention is the use of two groups of reactor plates, with each plate being relatively small in size and provided with internal passages to permit a refrigerant of a refrigeration system to pass therethrough for cooling the same. Each plate carries its own dielectric by virtue of a ceramic coating covering its entire outer surface. Thus, the plates of one group can be interleaved with and cantilevered relative to the plates of the other group without contacting the same. Thus, the plates need not be relatively large and they can be quite close together as there is a substantially infinite "creep distance" between the plates. Since the plates can be relatively small in size and close together, they can be housed in a minimum of space to provide a small, neat package for generating ozone.

The "creep distance" of the ozone generator of this invention is quite long because of the absence of dielectric posts spanning the distance between the plates as in the prior patents mentioned above. This distance in the present invention is measured along a path extending between the mounts of each pair of adjacent plates. This path, therefore, includes a stretch of the housing or support to which the mounts are secured. Such a stretch is quite long, i.e., of the order of several inches. Moreover, this path is remote from the plates and the air space therebetween so that the need for frequent cleaning and removal of foreign material along the path is eliminated. Thus, the dielectric coatings on the plates are not subjected to stresses as they are in the prior patents so that the operating life of the plates is greatly prolonged and the danger of arc-over is virtually eliminated.

The plates of each group are coupled together as a modular unit by a pair of tubular mounts which convey the refrigerant to the internal passages of the corresponding plates and which serve as the electrical connections thereto. Thus, the modular units defining the two groups of plates can be leak-tested before being placed in a housing within which ozone is to be generated.

Another feature of the present invention is the fact that the two groups of reactor plates form a unit which substitutes as the evaporator for a refrigeration system whose refrigerant passes into the internal fluid passages of the reactor plates in heat exchange relationship thereto. The refrigerant is Freon which is electrically non-conductive. The use of a refrigeration system eliminates the need for additional flow structure, such as pipes, condensers and the like when, for instance, water or oil is used as a coolant. Also, a portion of the refrigerant can be used to pre-cool the air which is directed toward and into the spaces between the reactor plates.

A further feature of the present invention is the use of fluid distribution and control means at the inlet and outlet ends of the housing containing the reactor plates. The inlet control means permits air entering the housing to be uniformly distributed to the spaces between the reactor plates to increase the efficiency of production therebetween. The outlet control means provides a small, uniform back-pressure in the spaces between the plates to assist in distributing the incoming air in such spaces.

The primary object of this invention is, therefore, to provide an improved ozone generator operable to produce ozone more efficiently and safely than is capable with ozone generators of conventional construction, yet the generator will have a long, substantially maintenance-free operating life.

Another object of this invention is to provide an improved ozone generator comprised of a plurality of spaced interleaved reactor plates, with each reactor plate having fluid passage means therein and having a uniform ceramic coating on its entire outer surface, whereby a refrigerant can be directed through the plates to cool the same and the coating on each plate provides the dielectric therefor and permits the use of relatively inexpensive metals as the material for the electrode plates.

A further object of this invention is to provide an ozone generator of the type described wherein a refrigerant of a refrigeration system is directed through the internal fluid passages of the reactor plates to cool the same and to avoid the need for conventional coolants, such as water or oil, to thereby minimize the cost of maintaining the ozone generator while keeping its capacity relatively high.

Still another object of this invention is to provide a generator for ozone of the type described wherein the generator has improved fluid flow distribution and control means at the inlet and outlet end of the housing thereof to distribute the incoming air and to collect the outgoing ozone more efficiently to thereby assure efficient operation of the generator irrespective of its capacity.

A further object of this invention is to provide an ozone generator having two groups of spaced, interleaved plates having ceramic coatings on their entire outer surfaces wherein all plates are cooled so that both sides of the plates can be used to produce ozone, the plates can be relatively small in size and close together to assure optimum ozone production, and the plates can be housed in a minimum of space.

Other objects of this invention will become apparent as the following specification progresses, reference being had to the accompanying drawings for an illustration of the invention.

In the drawings:

FIG. 1 is a perspective view of an ozone generator of this invention, parts being broken away and in section to illustrate details of construction;

FIG. 2 is a side elevational view of one of the reactor plates of the ozone generator of FIG. 1;

FIG. 3 is an enlarged, fragmentary, side elevational view of one of the reactor plates;

FIG. 4 is an enlarged, cross-sectional exploded view of a pair of plates used to construct a reactor plate;

FIG. 5 is a cross-sectional view of a completed reactor plate;

FIG. 6 is an enlarged, fragmentary, top plan view of a mount for one of the group of reactor plates of the ozone generator;

FIG. 7 is a cross-sectional view of a fitting forming a part of one of the mounts;

FIG. 8 is a fragmentary, cross-sectional view of one of the reactor plates, showing the way in which a pair of fittings of one of the mounts are coupled to the plate.

FIG. 9 is a view similar to FIG. 8 but showing another embodiment of a pair of fittings attached to a reactor plate; and FIG. 10 is a block diagram of a system utilizing the ozone generator and a refrigeration system for directing a coolant through the reactor plates to cool the same.

The ozone generator of this invention is broadly denoted by the numeral 10 and includes a housing 12 within which is mounted an assembly 14 of reactor plates which are spaced apart and between which ozone is generated when an electric field is established between each pair of adjacent plates. Assembly 14 is comprised of two groups of reactor plates, namely, a first group of plates 16 coupled by a pair of spaced, parallel mounts 18 to a pair of spaced, flat, parallel sides 20 of housing 12 and a second group of reactor plates 22 coupled by a pair of spaced, parallel mounts 24 to sides 20. Plates 16 are interleaved with plates 22 as shown in FIG. 1. While only a pair of reactor plates 16 and a pair of plates 22 are shown and described herein, it is possible that more reactor plates 16 and 22 can be used in ozone generator 10, if desired. Mounts 18 and 24 are substantially parallel with each other.

Housing 12 presents a central closed space 25 in which plate assembly 14 is removably mounted. To this end, mounts 18 and 24 are removably secured to sides 20 and are assembled thereto as the housing is assembled. This permits each group of plates to be formed as a modular unit so that it can be leak-checked before being installed in housing 12. To permit assembly of housing 12, the latter has a pair of first, parallel end walls 26 and a pair of second, parallel end walls 28, both pairs of end walls spanning the distance between sidewalls 20. Sides 20 can be of an electrically insulative material or means can be provided to electrically isolate mounts 18 and 24 from sides 20.

Housing 12 also includes a fluid inlet manifold 30 adjacent to one of the second end walls 28 and a fluid outlet manifold 32 adjacent to the other second wall 28. Manifolds 30 and 32 have conduits 34 and 35 coupled thereto providing inlet and outlet paths, respectively, to and from housing 12.

A porous wall 36 is disposed between central closed space 25 of housing 12 and inlet manifold 30. Wall 36 has a number of spaced holes 38 therethrough by means of which air or oxygen entering inlet manifold 30 through conduit 34 will be uniformly distributed into central space 25 and thereby uniformly between the reactor plates of plate assembly 14. In lieu of holes, wall 36 could be of sintered material.

Similarly, a porous wall 40 is provided at the junction of space 25 of housing 12 and outlet manifold 32. Thus, air and ozone within space 25 can pass uniformly out of the same and into outlet manifold 32 for flow out of the latter through outlet conduit 35. Also, wall 40 provides a small back-pressure in the spaces between plates 16 and 22 to facilitate the uniform distribution of air in such spaces.

Reactor plates 16 and 22 are substantially identical with each other. Each plate, as shown in FIG. 2, has a pair of spaced ears 46 extending laterally from a side margin 47 near opposed ends of the plate. Each ear has a hole 48 (FIG. 3) therethrough. For purposes of illustration, each plate is formed from a pair of initially flat, relatively thin metallic plates 50 and 52 (FIG. 4) having elongated recesses 54 and 56 formed therein, such as by etching, milling and the like, there being a number of such recesses in each thin plate, respectively. When plates 50 and 52 are bonded together at their outer marginal edges, recesses 54 and 56 mate with each other and form a plurality of independent, fluid passages 58 through the resulting reactor plate, each passage 58 extending from one hole 48 to the opposite hole 48 as shown in dashed lines in FIG. 2. Also, each fluid passage 58 is in fluid communication with holes 48 by means of slots 86 (FIGS. 8 and 9).

Plates 50 and 52, for instance, are in the range of 10 to 30 mils in thickness and are preferably brazed together to provide the necessary rigidity, dimensional tolerance and heat transfer capability. The depth of the fluid passage is of the order of 5 to 20 mils in thickness depending upon the degree of cooling desired, so that proper heat transfer will be established between the plates and a coolant flowing through passage 58 to cool the plates. Other configurations of the fluid passage in each reactor plate can be used, if desired.

As shown in FIG. 5, each reactor plate 16 or 22 has a ceramic coating 70 thereon to provide a dielectric therefor, the coating being on the entire outer surface of each reactor plate except for an annular region 69 (FIG. 3) surrounding each hole 48, respectively, on opposed sides of the plate. Thus, regions 69 of each hole permit electrical contact with the reactor plate by the corresponding mount. The ceramic material, for instance, is porcelain having a high dielectric constant material, such as titanium oxide. The coating is of uniform thickness and free from cracks.

Mountings 18 and 24 are all of substantially the same basic construction. Each mounting is tubular and is of metal so that it is electrically conductive. This allows one of mountings 18 to serve as a first electrode and one of mountings 24 to serve as the second electrode, the electrodes to be coupled to an electrical power source 71.

As shown in FIG. 6, each mounting is comprised of a first fitting 72 spanning the distance between and coupled with adjacent reactor plates and a pair of end fittings 78 and 80 on the outer faces of the reactor plates. In one form of the mount, the fittings are rigidly secured to and in electrical contact with the metallic portion 69 (FIG. 3) of each plate (FIG. 9) such as by welding or brazing. This assures a permanent connection of the mount to the plate and one which can be leak-tested before being assembled to housing 12.

In another form of the mount, the fittings are not welded or brazed to the metallic portions 69 of the plates but are held in engagement therewith by threaded fasteners, such as nuts threaded onto the outer fittings 78 and 80 and engaging housing sides 20. Thus, the fittings can be separated from each other to facilitate replacement of reactor plates yet the mounts and reactor plates can be leak-tested before being assembled to housing 12.

In the latter embodiment, each fitting 72a has a pair of opposed annular recesses 74 in the end faces thereof (FIG. 7) surrounding the central passage 76 therethrough. Recesses 74 are adapted to receive O-rings 75 (FIG. 9a) for sealing the junction between fittings 72a and plates 16 at the ends of the fittings. Similarly, end fittings 78a and 80a have the same end face configuration as fitting 72a for engaging the corresponding side of the plate 16. Fittings 78 and 80 of mounts 18 and 24 pass through sides 20 of housing 12 for mounting reactor plates thereon. Each fitting 78 is closed at one end thereof, such as by an end cap 79.

Each fitting 80 is coupled to a refrigeration system 82 (FIG. 10) so that the refrigerant of such system will flow into passages 58 of the reactor plates in heat exchange relationship thereto. For instance, for plates 16, the refrigerant will pass from a first mount 18 into slots 86 of plates 16, through passages 58 thereof, and out of the other slots 86 to the opposite mount 18. For this case, plates 16 and 18 define the evaporator for the refrigeration system.

To assemble ozone generator 10, the two groups of plates 16 and 22 are coupled to sides 20 of housing 12. Then the remaining walls 26, 28, 36 and 40 of the housing are then assembled to sides 20 to enclose the plates and also to form the inlet and outlet manifolds 30 and 32. One of the mounts 18 is coupled to one side of power source 71 and one of the mounts 24 is coupled to the other side of the power source. Also, a coolant or refrigerant entering one fitting of a group of plates will flow through the two or more plates of the group and then out of such plates through the other fitting of the corresponding group. When ozone generator 10 is assembled, the high tension plates, either plates 16 or 22, extend beyond the grounded plates a sufficient distance so that arc-over from side effects is eliminated.

The creep distance of ozone generator 10 is the distance from a plate 16 along one of its mounts 18 to an adjacent side 20, then through the side 20 to the next adjacent mount 24, and along the latter mount to the next adjacent plate 22. This distance is quite long, of the order of several inches.

In operation, the pressure side of refrigeration system 82 is coupled to one of the mounts 18 and one of the mounts 24 so that coolant can flow into such mounts and into passages 58 of respective plates 16 and 22. The reservoir side of refrigeration system 82 is coupled to the other mounts 18 and 24 for receiving the coolant after the latter has passed in heat exchange relationship through passages 58 of the reactor plates to cool the same. With an electrical power source coupled as shown in FIG. 1, electrical field intensities are established between adjacent reactor plates.

With air or oxygen directed under pressure into inlet manifold 30 and with an electrical field established between the plates, the air or oxygen will pass through openings 38 of porous wall 36 and into space 25 between adjacent reactor plates so as to be ionized to form ozone. When generated, the ozone moves out of the housing, through the holes in porous wall 40, into outlet manifold 32 and then out of the same through conduit 35 for collection in any suitable manner at a remote location. During the generation of ozone, the coolant or refrigerant flowing through passages 58 will keep the plates at a relatively low temperature to assure optimum generation of ozone inasmuch as the air temperature between reactor plates, if elevated too high, will have an adverse effect on the generation of ozone.

The present invention provides and assures for optimum and efficient generation of ozone inasmuch as substantially all of the reactor plate surfaces are available for ozonation. Also, the method of the fabrication of each plate allows for maximum cooling in a minimum of space. This is possible because fluid passages 58 can be of a suitable depth to provide strength for each plate yet permit the coolant to be directed very closely to the working surfaces of the plates.

The reactor plates are easily accessible and can be replaced merely by disassembling the housing and separating the plate groups from the housing. The ability to completely test and leak-check a group of reactor plates before insertion in the system is another feature which renders the present invention readily adapted for efficient production of ozone. Because the dielectric is a coating on the plates, this assures that the absence of any dielectric support within the corona discharge zone will extend electrode life free from dielectric spacer surface contamination and eventual breakdown.

Refrigeration system 82 also includes a compressor 112, a condensing unit 114 cooled by water which is passed into and out of the same, and an expansion valve 116 provided in the outlet line 118 from the condensing unit 114 to ozone generator 10. Line 118 is coupled to one of the mounts 18 and one of the mounts 24. The inlet line 120 to the condensing unit is coupled to the other mount 18 and 24. Freon 12 is the refrigerant used in system 82.

It is desirable to construct the reactor plates in a manner such that for a given volume rate of flow of Freon into the plates approximately 15% of the Freon leaving the reactor plates and moving toward the compressor is in a liquid state and the remaining 85% is in the gaseous state. The liquid Freon has further cooling capability and that capability is used to pre-cool the air entering the ozone generator. To this end, the Freon is directed through a heat exchanger 121 in series with compressor 112. The incoming air moving toward ozone generator 10 is directed through heat exchanger 121 and is cooled before entering ozone generator 10. This causes the liquid Freon to vaporize and to enhance the overall system efficiency.

The use of the refrigerant as a coolant minimizes the size and the complexity of the system, including the reactor plates, inasmuch as the reactor plates substitute as an evaporator of the refrigerant system itself. Moreover, Freon is a more effective heat transfer fluid than oil or water.

In operation, a typical set of parameters for system 82 is as follows: The ozone generating capacity is 15 pounds per day. The surface density of the reactor plates 16 and 22 is 1000 watts per square foot. Dry air is fed into ozone generator 10 at 68°F. The power dissipated in the system is 5 to 8 kilowatt hours per pound of ozone generated. The applied voltage to the high tension reactor plates is 7,000 to 12,000 volts rms at a frequency of 2,000–20,000 Hz. The refrigerant is Freon 12 and cooling requirements are 90% of total power. The dielectric thickness, i.e., the thickness of coating 70, is about 0.012 inch and the discharge gap between a pair of reactor plates is 0.05 to 0.09 inch.

Plates 16 and 22 are spaced from each other and are essentially cantilevered relative to each other. Thus, there are no connecting posts or dielectrics between adjacent plates so that the creep distance is substantially infinite to prevent arc-over therebetween. Thus, the plates can be nested quite closely to each other to provide a neat, compact assembly. This feature permits housing 12 to be of relatively small size yet the production of ozone is optimized, notwithstanding the compact nature of the plate assembly. Also, the fact that all of the plates of the assembly can be internally cooled assures optimal ozone production because the production rate of ozone decreases as air temperatures in the spaces between the plates increases.

The advantage of using a plurality of fluid passages 58 in each reactor plate assures that the refrigerant paths through each plate are of minimum distance. Thus, the pressure drop along each refrigerant path is minimized, thereby making the use of a refrigeration system feasible for use in cooling reactor plates of an ozone generator. Otherwise, if the fluid paths 58 were longer, such as a single, serpentine fluid path between holes 48 of a reactor plate, there would be an extremely high pressure drop along such path, requiring inlet fluid pressures possibly so high that the plate itself would rupture. In the present invention, the internal fluid pressures in the reactor plates are kept to a minimum, thereby avoiding this problem.

We claim:

1. In an ozone generator: a housing having a fluid inlet end and a fluid outlet end; a plurality of reactor plates; means mounting said reactor plates within said housing in spaced, side by side relationship with respect to each other; and first and second fluid distribution means adjacent to the inlet and the outlet ends, respectively of said housing for permitting a fluid to flow uniformly into spaces between the plates, the second means including means for generating a back pressure in the spaces between the plates before permitting the fluid to flow through the outlet end to facilitate a homogeneous fluid flow past the reactor plates in the housing, the back pressure generating means comprising wall means disposed transversely to the plates and separating a portion of the housing occupied by the plates from the outlet, the wall means including a plurality of openings evenly distributed over the wall means, each opening being of a lesser transverse extent than the outlet.

2. An ozone generator comprising a housing having a fluid inlet end and a fluid outlet; a plurality of reactor plates disposed within an interior space of the housing; means mounting the reactor plates in the space closely adjacent to each other in an interleaved, spaced relationship with respect to each other to define open passages between the plates which are in fluid communication with each other; and first and second fluid flow control walls mounted transversely to the plates within the housing between the space and the inlet and the outlet, respectively, the first wall including a plurality of evenly distributed openings establishing fluid communication between the inlet and the space for evenly dividing an incoming airstream from the inlet into the passages between the reactor plates, and the second wall including a plurality of evenly distributed openings establishing fluid communication between the space and the outlet for forming a homogeneous back pressure in the passages between the reactor plates, whereby the walls cause a uniform flow of the airstream through all passages between the plates.

* * * * *